United States Patent [19]

Bryant et al.

[11] 3,777,165
[45] Dec. 4, 1973

[54] SENSING APPARATUS

[75] Inventors: Jack A. Bryant, Boston; Elihu Craig Thomson, Wellesley, both of Mass.

[73] Assignee: Electronics Corporation of America, Cambridge, Mass.

[22] Filed: Mar. 31, 1972

[21] Appl. No.: 240,056

[52] U.S. Cl. .................... 250/219 D, 235/61.11 E
[51] Int. Cl. ........................................ G01n 21/30
[58] Field of Search ............... 250/219 D, 219 DR, 250/219 CR, 219 LG, 220, 221, 222, 223; 235/61.11 E; 340/146.3

[56] References Cited
UNITED STATES PATENTS

| | | | |
|---|---|---|---|
| 3,529,133 | 9/1970 | Kent | 250/219 D |
| 3,322,935 | 5/1967 | Wyke | 250/219 D |
| 3,432,673 | 3/1969 | Mader | 250/219 CR |
| 3,104,369 | 9/1963 | Rabinow | 250/219 CR |
| 3,104,370 | 9/1963 | Rabinow | 250/219 CR |
| 3,142,761 | 7/1964 | Rabinow | 250/219 CR |
| 3,432,032 | 3/1969 | Curphey | 250/219 CR |
| 3,136,976 | 6/1964 | Dietrich | 250/219 CR |

Primary Examiner—James W. Lawrence
Assistant Examiner—D. C. Nelms
Attorney—Willis M. Ertman

[57] ABSTRACT

Scanning apparatus includes a linear array of sensors so that there is effectively a series of independent sensor elements disposed in aligned relation generally perpendicular to a scanning axis. Each sensor is arranged to provide a data output in response to a sensed code mark and an output channel is coupled to each sensor. Logic responsive to detection of a first code mark by a sensor of the array enables at least one code sensitive group of output channels and disables other output channels so that only a limited group of channels are rendered responsive to subsequently detected code marks.

13 Claims, 9 Drawing Figures

PATENTED DEC 4 1973
3,777,165
SHEET 1 OF 2

SENSING APPARATUS

SUMMARY OF INVENTION

This invention relates to sensing apparatus and more particularly to article scanning apparatus.

In article scanning apparatus, for example of the type for sorting articles that move past a sensor on a conveyor system, each article may carry an identifying code defined, for example, by a row of code marks on a label. The sensing station adjacent the conveyor senses the row of code marks as the article passes the sensing station and decodes the sensed code marks to provide an indication of the coded information. The label or surface of the article which carries the coded information may have additional data such as alphanumeric characters which must be distinguished from the code marks. Further, the position of the row of code marks may not be fixed in position relative to the scanner. For example, they may be lateral offset of code mark rows between articles or the code mark row may be skewed with respect to the scanning direction.

It is an object of this invention to provide novel and improved scanning apparatus.

Another object of this invention is to provide novel and improved code sensing apparatus for which accommodates substantial variation in the position or orientation of code marks relative to the sensor of the scanning apparatus.

In accordance with the invention there is provided scanning apparatus for use with articles that have a series of code marks thereon. The scanning apparatus includes a linear array of sensors arranged so that there is effectively a series of independent sensor elements disposed in aligned relation generally perpendicular to the scanning axis. An output channel is coupled to each sensor and the apparatus includes means responsive to a sensor data output to enable its output channel as a primary channel and to enable the immediately adjacent channel as a secondary channel. Other channels of the array are de-energized or disabled.

In particular embodiments, the scanner system includes a linear array of solid state photosensors. A mask structure disposed in front of the photosensor array provides a slit that defines a photosensor read pattern, the read patterns of the several sensors being aligned end to end and independent of one another. The code mark is a bar and preferably the slit width of the mask is less than the "effective" (as sensed) width of the code bar and the "effective" height of the code bar is at least twice the length of the read pattern. Logic responsive to the article to be sensed initially applies an enabling signal to all the channels. On detection of a first code bar by sensors of the array, the corresponding channels have a data output which is applied to a suitable data storage device such as a shift register and the channels also generate conditioning signals that establish a code sensitive group that includes a primary channel or channels and a secondary immediately adjacent channel on the either side of the primary channel or channels. All the other output channels are disabled and hence only a limited group of channels in the system are rendered responsive to subsequent code markings. (If a plural line code is to be sensed, logic is provided to similarly enable a corresponding group or groups of sensors offset in predetermined amount from the group of channels energized by the detected code bar.)

The system thus selects a particular group or groups of output channels corresponding to the detected location of a code bar, accommodating substantial lateral offset between successive code rows, for example. As the scanning operation continues, if the code row is skewed relative to the scanning axis, one of the adjacent secondary channels will become a primary channel due to this skew and this newly energized primary code reading channel will cause the next adjacent channel to be enabled as a secondary channel. On the opposite side of this primary code reading sensor group, the previously enabled secondary channel will become de-energized and the condition of the primary channel on that side of the group will change to secondary condition. As the skewed code row passes the sensor array, this process of shifting primary and secondary enabled channels continues as a function of the position of the sensed code marks until completion of the reading of the code.

In a specific embodiment, each channel includes a threshold amplifier which provides a data output and a delay logic responsive to the data output which provides a conditioning output. The conditioning output is applied to AND logic and the output of the AND logic is cross-coupled to a second input of corresponding AND logic of the adjacent channel on either side. This cross-coupling provides a latching function to define two or more primary channels and an enabling function to define two secondary channels, one on either side of the group of primary channels.

Other objects, features and advantages will be seen as the following description of a particular embodiment progresses, in conjunction with the drawings, in which.

DESCRIPTION OF PARTICULAR EMBODIMENT

Figure 1:
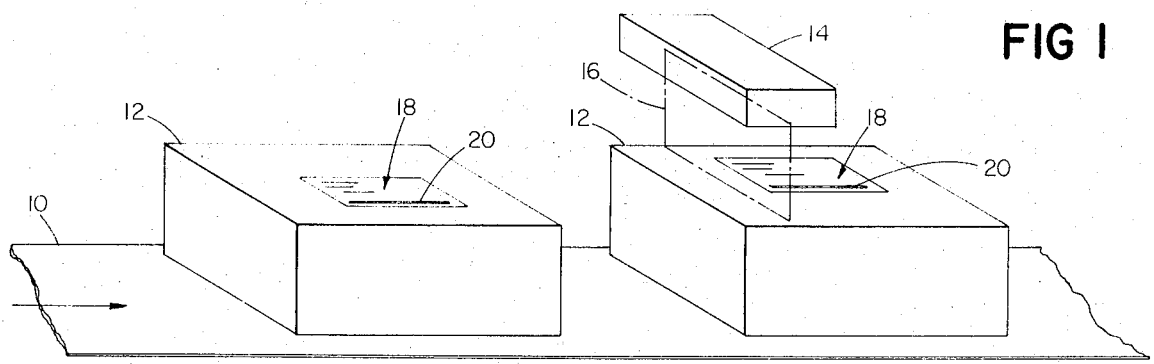
FIG. 1 is a diagrammatic view of a conveyor for use with scanning apparatus in accordance with the invention.

With reference to FIG. 1, there is shown a conveyor 10 on which is supported a series of cartons 12 for movement past a scanner station 14 that includes a sensor array for sensing along a plane diagrammatically indicated at 16. Each carton 12 has a label 18 on its upper surface, each label bearing a series of code bars arranged in one or more rows 20.

Figure 2:
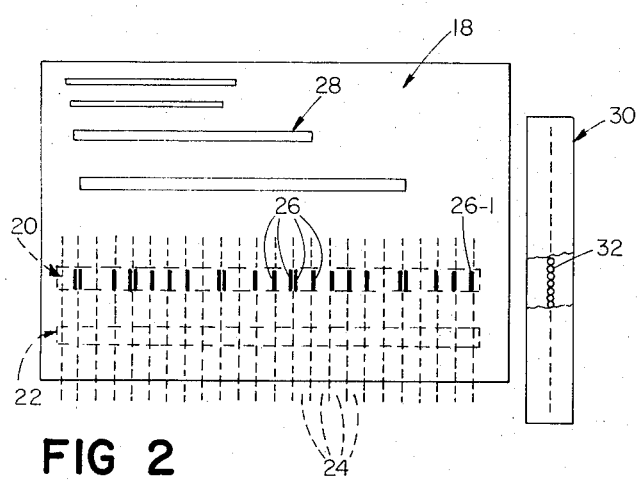
FIG. 2 is a diagrammatic view indicating the relationship of the sensor array of the scanning apparatus shown in FIG. 1 and a typical code arrangement on an article.
Figure 3:
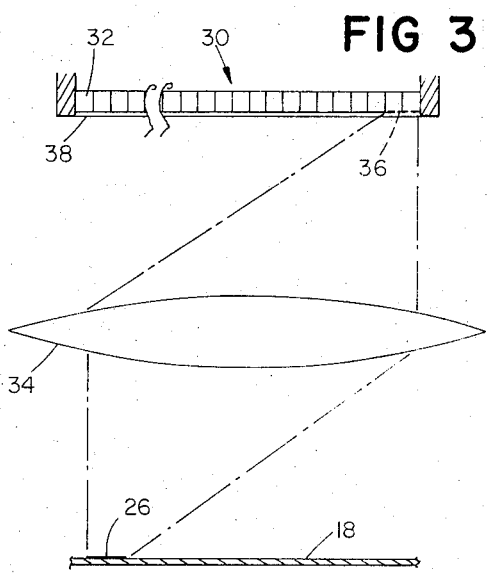
FIG. 3 is another diagrammatic view indicating the relationship between the sensor array and an article being sensed.

Additional details of the scanner array and a typical cooperating code configuration may be seen with reference to the diagrams of FIGS. 2 and 3. The label 18 or other area has one or more rows 20, 22 of code bars on it. A variety of code configurations may be used in the practice of the invention, the illustrated code arrangement being read from right to left and having a code bar 26 in each digit space 24. A supplemental series of clock or sync bars (one for each digit space) may be provided or read out logic of the type disclosed in copending application Ser. No. 240,147, filed concurrently herewith in the name of Elihu Craig Thomson, entitled "Sensing System" and assigned to the same assignee as this application may be used. In the illustrated arrangement, a code bar 26 in the right half of the digit space represents a binary one and a code bar 26 in the left half of the digit space represents a binary zero. Thus the code represented by row 20 is 111010000011101000001101. The system responds to a first code mark and is rendered unresponsive to markings not aligned with the identified row or rows of code marks. Thus alphanumeric data may appear in other portions of the label, as at 28 without interference with the scanning and code reading operations.

Figure 4:
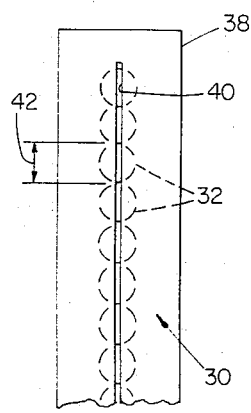
FIG. 4 is an enlarged view of a portion of the sensor array.

A linear array 30 of sensors 32 such as photodiodes are disposed in a line in plane 16. A simple lens system, diagrammatically indicated at 34 in FIG. 3, may be employed to optimize conditions such as depth of field and/or light and produces an "effective" code bar pattern 36 at the sensor array 30. A mask structure 38, disposed in front of the sensor array, has a slit 40 as indicated in FIG. 4. The width of slit 40 is less than the width of "effective" code bar image 36, a preferred relation being in the range of 60–80 percent, and the height of the "effective" code bar image 36 is twice the length 42 of the sensitive area of a photosensor 32. Thus the masked photosensor array defines a series of independent elongated sensor areas arranged end to end in a row in plane 16.

Figure 5:
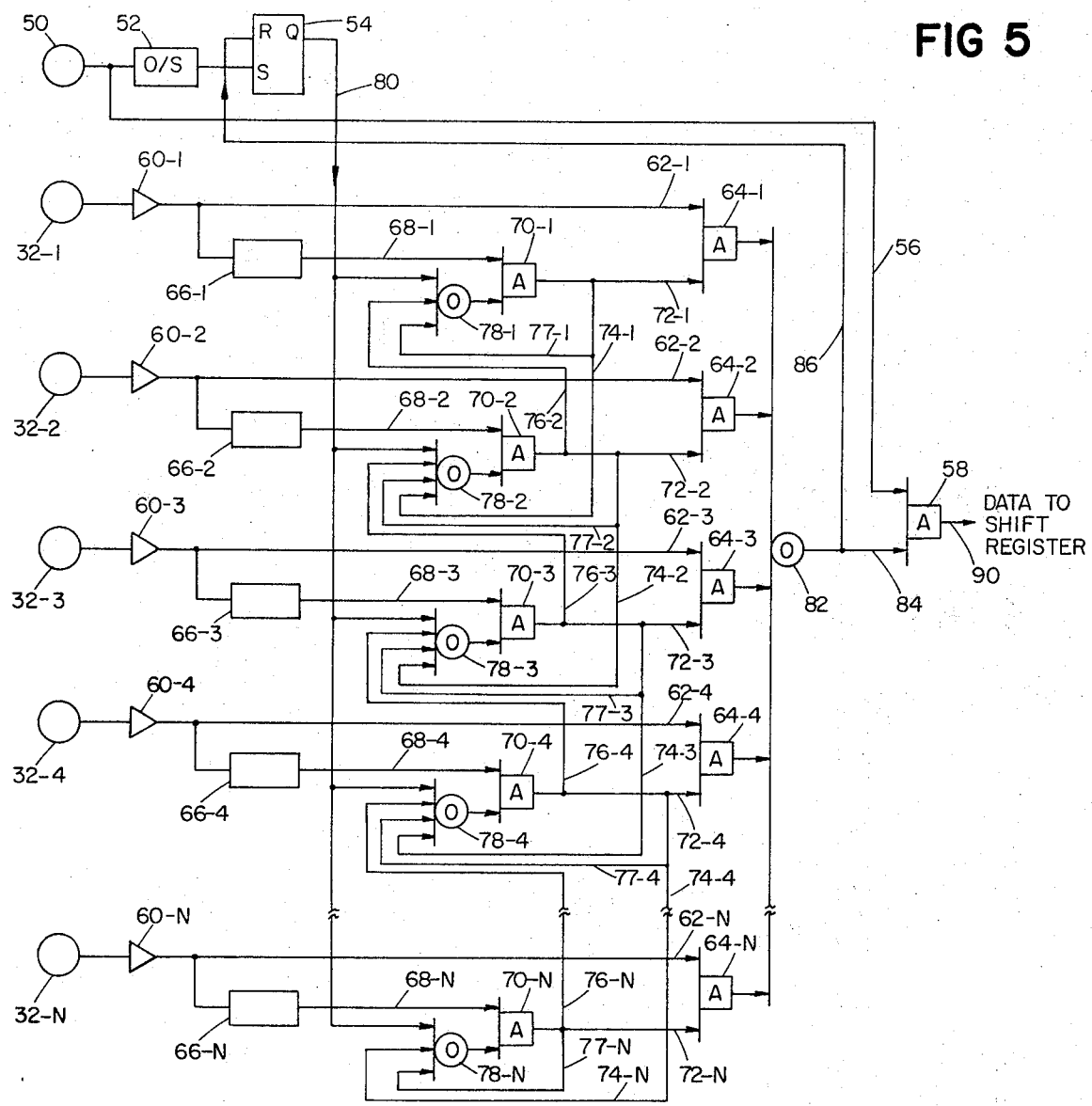
FIG. 5 is a block diagram of control logic responsive to output signals of the sensor array.

The control logic connected to sensors 32 is indicated in FIG. 5. That control logic includes an enabling sensor 50 whose output is coupled to one shot 52 whose output in turn is applied to set flip flop 54. The output of sensor 50 is also applied over line 56 as a conditioning input to AND circuit 58.

Each sensor 32 has an output logic channel associated with it which includes an amplifier 60 that generates a data output over line 62 as an input to AND circuit 64. The output of amplifier 60 is also applied to a digital filter or time delay circuit 66 that, in this embodiment, has operational characteristics similar to a DADE (delay after de-energizing) timer. The output of logic circuit 66 is applied over line 68 as a conditioning input to AND circuit 70, and the output of AND circuit 70 is applied over line 72 as a conditioning input to AND circuit 64. The output of each AND circuit 70 is also applied over lines 74, 76 as an enabling input to the OR circuit 78 of the immediately adjacent channel on either side. (Line 77 may be provided to feed back the AND circuit output through its own OR circuit 78 to latch the logic channel is enabled state as long as its timer 66 has an output.) OR circuits 78 have an additional input from the set output on line 80 of flip flop 54. The outputs of AND circuits 64 are applied to OR circuit 82 whose output is applied as a conditioning input on line 84 to AND circuit 58 and as a resetting signal on line 86 to flip flop 54. The output of AND circuit 58 is applied over line 90 to data storage or processing logic.

In operation, when a code bar 26 is sensed by array 30, two or more sensors 32 produce signals which are processed by amplifiers 60. Amplifiers 60, in this particular embodiment, are threshold devices that provide a data output only if the input signal from its coupled sensor is above a predetermined value. At least two adjacent sensors have outputs as the "effective" height of the code bar pattern 36 is twice the length 42 of the sensor area as defined by mask 38.

As an article 12 is moved past plane 16 by conveyor 10, control sensor 50 is actuated to trigger one shot 52, setting flip flop 54 to provide a conditioning output on line 80 to all the OR circuits 78 to condition one input of all the AND circuits 70 of all the sensor channels as an indication that a code is to be read. The output of article sensor 50 is also applied over line 56 as a conditioning input to AND circuit 58. Upon detection of a first code mark, at least two sensors 32 produce outputs which trigger coupled logic circuits 66 and apply conditioning outputs over corresponding lines 68 to the second inputs of AND circuits 70. As a result, the AND circuits 70 of the channels whose amplifiers 60 produced enabling outputs in turn produce outputs. These outputs are applied over corresponding lines 72 and together with the data signals on lines 62 produce outputs from AND circuits 64. Those data outputs are applied through OR circuit 82 on line 84 and produce an output from AND circuit 58 that is applied as a data signal to a suitable storage device such as a shift register.

Suitable synchronizing data provided by control logic or an accompanying sync code row, for example, distinguish between the sensed ONE and ZERO data values. The first data output of OR circuit 82 is applied over line 86 to reset flip flop 54, removing the initial enabling signal from line 80. However, the AND circuits 70 of the two or more conditioned sensor channels are also applied to the adjacent sensor channels over lines 74 and 76, respectively, as conditioning signals. As an example, assume sensors 32-2 and 32-3 produced outputs which in turn caused AND circuits 70-2 and 70-3 to produce outputs. The output of AND circuit 70-2 is applied to AND circuit 70-1 via OR circuit 78-1 as a conditioning signal, and through OR circuit 78-3 to AND circuit 70-3 as a conditioning signal. As AND circuit 70-3 has a conditioning signal from timer 66-3, that AND circuit is "latched" so that its output is maintained. A similar latching effect is produced as a result of the output 70-3 of AND circuit 70-3 over line 76-3 through OR circuit 78-2 to AND circuit 78-2. Thus, AND circuits 70-2 and 70-3 are latched, establishing channels 1 and 4 as primary channels, and OR circuits 78-1 and 78-4 provide conditioning levels to AND circuits 70-1 and 70-4 (the immediately adjacent channels to the latched primary channels) establishing those channels as secondary channels. The other channels are de-conditioned.

Figures 7A, 7B, 7C:
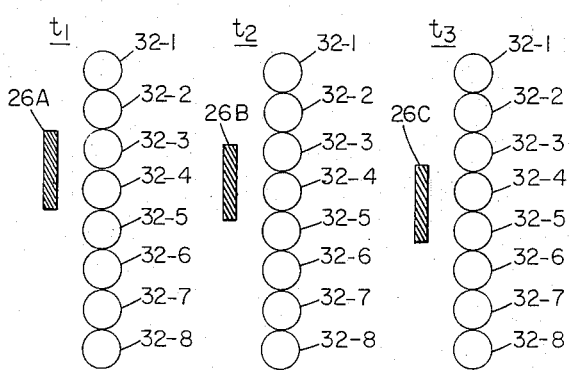
FIGS. 7A–7C is a timing diagram indicating a sequence of operation of the logic shown in FIG. 5 with reference to the diagrams shown in FIG. 6.
Figure 6:
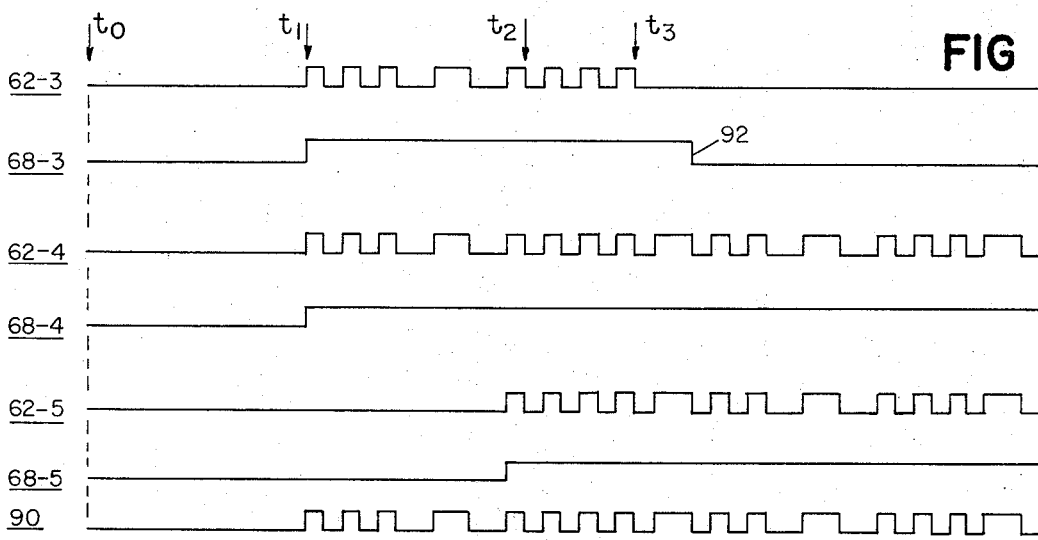
FIG. 6 is a series of diagrams indicating the nature of cooperation between code marks and elements of the sensor array.

A further understanding of operation of the scanner apparatus may be had with reference to FIGS. 6 and 7. At time $t_0$ sensor 50 produces an output which sets flip flop 54 to generate an enabling level on line 80, and also to provide a conditioning level on line 56. The first code bar is sensed at time $t_1$. As indicated in FIG. 7A, code bar 26A is aligned with sensors 32-3 and 32-4 and therefore amplifiers 60-3 and 60-4 produce data outputs on lines 62-3 and 62-4 as indicated in FIG. 6 and trigger timers 66-3 and 66-4 to provide outputs on liners 68-3 and 68-4 to AND circuits 70-3 and 70-4. The enabling outputs of timers 66-3 and 66-4 are applied to the conditioned AND circuits 70-3 and 70-4 and the resulting outputs of those AND circuits are applied to AND circuits 64-3 and 64-4 to pass data signals to OR circuit 82. These data signals are applied on line 84 to AND circuit 58 and that AND circuit produces a data output pulse on line 90. The data signals on line 62-3 and 62-4 terminates when code sensors 32-3 and 32-4 no longer sense code bar 26A, but the outputs of timers 68-3 and 68-4 continue, the dropout time delay being a function of the type of code being sensed and in this embodiment corresponds to two data spaces 24. Thus, as the code bars 26 are moved past scanning plane 16, data pulses are applied on lines 62-3 and 62-4 as indicated in FIG. 6. If the code bar row is skewed, the successive effective code bars will shift relative to the sensor array, e.g. to a position indicated in FIG. 7B. Threshold amplifiers 60 may be set to produce an output at twenty percent of the full signal level. Thus at time $t_2$ when code bar 26B is positioned relative to the sensor array as indicated in FIG. 7B, sensor 32-5 has an output. The resulting output generates signals on lines 62-5 and 68-5 as indicated in FIG. 6 and thus three channels (channels 3-5) are concurrently producing data output signals are in latched or primary condition and channels 2 and 6 are in secondary or enabled condition. As scanning continues, the code bar position relative to sensor array 30 may shift to the position indicated in FIG. 7C. In that position code bar 26C has shifted to be aligned with less than twenty percent of sensor 32-3 and hence its amplifier 60-3 does not produce an output. Channels 4 and 5 however do produce outputs and data pulses are applied on line 90. The timer 66-3 drops out as indicated at line 92 and channel 2 changes from primary condition to second condition. Thus the skew of the code row has been caused the primary channels of the sensor array to shift from channels 3 and 4 to channels 4 and 5. Additional skewing or shifting of the position of the code row relative to the scanner array will cause similar shifting of the primary and secondary channels.

Numerous modifications and additions to this circuitry will be apparent to those skilled in the art. For example, two or more rows of code bars may be read. The sensing of an initial code bar such as code bar 26-1 will enable correspondingly spaced groups of primary and secondary sensors as a function of the spacing of the rows of code bars, this spacing preferably being more than twice the "effective" height of the code bars so to avoid overlap of the secondary channels of the groups.

While a digital logic arrangement has been disclosed, modifications of that digital logic arrangement such as provision of latch circuits or as a function of the type of code being scanned, may be made. Also, analog signal processing rather than digital signal processing may be employed.

Therefore, while a particular embodiment of the invention has been shown and described, it is not intended that the invention be limited thereto or to details thereof and departures may be made therefrom within the spirit and scope of the invention as defined in the claims.

What is claimed is:

1. Scanning apparatus for use with an article that has a series of code marks comprising a linear array of sensors arranged so that there is effectively a series of independent sensor elements disposed in aligned relation generally perpendicular to a scanning axis, each said sensor element being arranged to provide a data output in response to a sensed code mark, an output channel coupled to each sensor, and means responsive to a sensor data output to enable its output channel as a primary channel and the channel immediately adjacent said primary channel as a secondary channel and to disable other output channels so that said primary and secondary channels are responsive to the next sensed code mark and said other output channels are not responsive to the next sensed code mark.

2. The apparatus as claimed in claim 1 wherein each said sensor is a solid state photosensor and further including a mask structure disposed between the photosensor array and the code to be sensed, said mask having a slit that defines a photosensor read pattern, the read patterns of said sensors being aligned end to end and being independent of one another.

3. The apparatus as claimed in claim 2 wherein the slit width of said mask is less than the sensed width of the code mark and the sensed height of he code mark is at least twice the length of said photosensor read pattern.

4. Scanning apparatus for use with an article that has a series of code marks comprising a linear array of sensors arranged so that there is effectively a series of independent sensor elements disposed in aligned relation generally perpendicular to a scanning axis, each said sensor element being arranged to provide a data output in response to a sensed code mark, an output channel coupled to each sensor, logic responsive to the article to be sensed for initially applying an enabling signal to all of said output channels, and means responsive to detection of a first code mark by a sensor of said array to enable a code sensitive group of output channels that includes a primary channel and two secondary channels and to disable other output channels more remote from said primary channel than said secondary channel so that said primary and secondary channels are responsive to a subsequent code marking and said other output channels are not responsive to said subsequent code marking.

5. The apparatus as claimed in claim 1 wherein each said output channel includes a threshold amplifier which provides a data output, delay logic responsive to the data output which provides a conditioning output, AND logic responsive to said conditioning output, and cross-coupling logic responsive to the output of said AND logic for providing a latching function to define at least two primary channels and an enabling function to define two secondary channels.

6. Scanning apparatus for use with an article that has a series of code marks comprising a linear array of sensors arranged so that there is effectively a series of independent sensor elements disposed in aligned relation generally perpendicular to a scanning axis, each said sensor element being arranged to provide a data output in response to a sensed code mark, an output channel coupled to each sensor, means responsive to the article to be sensed for initially applying an enabling signal to all of said output channels, and logic responsive to detection of a first code mark by a sensor of said array to enable at least one code sensitive group of output channels and to disable other output channels so that said one group of output channels is responsive to the next detected code mark and said other output channels are not responsive to said next detected code mark.

7. The apparatus as claimed in claim 6 wherein said logic includes means responsive to a first data output produced by an output channel in response to a sensed code mark for disabling all of said output channels, and coupling means responsive to each output channel for overriding said disabling means to maintain in enabled condition each said output channel producing said first data output.

8. The apparatus as claimed in claim 7 wherein said disabling means resets said initial enabling means.

9. The apparatus as claimed in claim 6 wherein said logic includes means responsive to a sensor data output to enable its output channel as a primary channel and an immediately adjacent output channel as a secondary channel.

10. The apparatus as claimed in claim 6 wherein each said output channel includes cross-coupling logic responsive to said data sensor output for providing a latching function to define a primary group that includes at least one output channel and an enabling function to define a secondary group that includes an output channel immediately adjacent an output channel of said primary group.

11. The apparatus as claimed in claim 10 wherein each said output channel cross-coupling logic includes AND logic responsive to the output of its sensor, and means coupling the output of said AND logic to the input of the AND logic of an immediately adjacent channel.

12. The apparatus as claimed in claim 11 wherein each said sensor is a photosensor and further including mask structure disposed in front of the photosensor array for defining a photosensor read pattern, the read patterns of said sensors being aligned end to end and being independent of one another.

13. The apparatus as claimed in claim 12 wherein the sensed height of the code mark is at least twice the length of said photosensor read pattern, and said cross-coupling logic latches said output channels so that there are at least two output channels in said primary group.

* * * * *